Nov. 4, 1952

B. G. DAMMERS 2,617,017

MIXING CIRCUIT

Filed May 6, 1949

INVENTOR.
BERNHARDUS GERHARDUS DAMMERS
BY Fred M Vogel
AGENT.

Patented Nov. 4, 1952 2,617,017

UNITED STATES PATENT OFFICE 2,617,017

MIXING CIRCUIT

Bernhardus Gerhardus Dammers, Eindhoven, Netherlands, assignor to Hartford National Bank and Trust Company, Hartford, Conn., as trustee Application May 6, 1949, Serial No. 91,693

In the Netherlands May 29, 1948

4 Claims. (Cl. 250—20)

This invention relates to improvements in or modifications of the mixing circuit described and claimed in British Patent Specification No. 7,614/48. The said prior patent specification describes and claims a mixing circuit in which the mixing stage and the oscillator stage each compromise an electrode system having a cathode, an anode and one or more grid electrodes and the grid circuit of the oscillator stage is coupled to the anode circuit thereof, wherein the cathode of the mixing stage and that of the oscillator stage are interconnected for high-frequency current and connected to earth by way of a common resistance which is not shunted for high-frequency and across which the oscillator voltages occur, the incoming signal oscillations being supplied to the grid of the mixing stage and the anode circuit thereof comprising a circuit tuned to the intermediate-frequency oscillations and further the coupling between the grid circuit and the anode circuit of the oscillator stage being of such strength and the supply voltages for the oscillator stage being of such values that the oscillator voltage is substantially undistorted.

At comparatively high frequencies (for example from 50 to 250 megacycles/sec.) a noticeable phase-shift of the oscillator voltage occurs due to the presence of a certain capacity of the cathode with respect to earth. As a result, the oscillator voltage transferred across the capacity between the cathode and the first control grid of the mixing stage to the high-frequency input circuit can no longer be compensated in a simple manner by the provision of a neutrodyne condenser between the anode of the oscillator stage and the input control-grid of the mixing stage.

Difficulties may also arise if an automatic volume control voltage is active at the first grid of the mixing stage. In this case inconveniences occur due to a direct voltage being set up across the resistance in the common cathode lead, which voltage is also active in the control circuit.

The present invention provides an improvement in or modification of the circuit described and claimed in the said prior specification, which is characterized in that an inductance is connected in series with or in parallel with the resistance not shunted for high-frequency. It may thus be ensured that the voltage at the oscillator cathode is in phase with that at the first control grid, which enables the action of the capacity between the cathode and the first control grid of the mixing stage to be compensated by means of a neutrodyne capacity. When the inductance is connected in parallel with the said resistance, it is capable of substantially absorbing the direct-current component of the current with the result that the direct-voltage loss across the resistance decreases.

Figure 1:
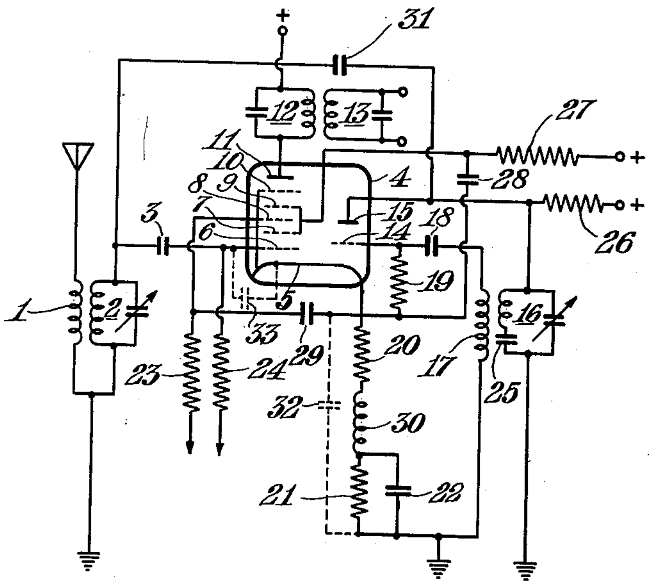
Figure 2:
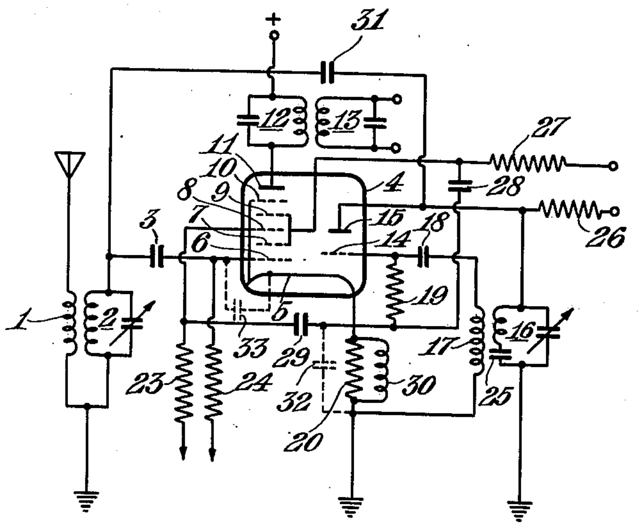

The invention will now be explained more fully by reference to the accompanying drawing in which:

Fig. 1 is a schematic diagram of one form of circuit arrangement in accordance with the invention and Fig. 2 is a schematic diagram showing a second embodiment.

The circuit shown in Fig. 1 comprises an aerial circuit 1, which is coupled inductively to an inductance coil comprised in an input circuit 2 tuned to the signal oscillations, of which one extremity is connected to earth and the other is connected by way of a condenser 3 to the first control grid 6 of a mixing system. This system comprises, in addition to the said grid 6, a cathode 5, a first screen grid 7, a control grid 8, a second screen grid 9, a suppressor grid 10 and an anode 11. The first grid 6 is connected by way of a resistance 24 to a voltage source (not shown) which supplies a control voltage for the purpose of automatic gain control. A control voltage may be supplied to the control grid by way of a resistance 23. The suppressor grid 10 is connected to the cathode 5. The anode 11 is connected to a tuned circuit 12, which together with a circuit 13 constitutes a band-pass filter for the intermediate-frequency oscillations. The mixing and the oscillator electrode systems are preferably housed in a common envelope and have a common cathode. The oscillator system further comprises a control grid 14, which is connected to the cathode or to earth by way of a leak resistance 19 and to earth by way of a condenser 18 and a coil 17, and an anode 15 which is connected to earth by way of a circuit 16 and to a point of positive potential by way of a resistance 26. As a rule, the tuning condenser of the circuit 2 will be mechanically coupled to that of the circuit 16, in which case a condenser 25 serves to ensure a constant frequency difference in such coupled tuning. The anode circuit and the grid circuit of the oscillator system are inductively connected to one another, so that oscillations are produced in both circuits. The oscillator currents also flow through a resistance 20 so that a mixture of the incoming and local oscillations occurs in the mixing system and voltages of the difference frequency are set up in the circuits 12 and 13. A suitable biassing potential for the grid of the mixing system is provided by a resistance 21 and a condenser 22.

Furthermore, the screen grids 7 and 9 are connected by way of a low impedance to the cathode 5. This low impedance comprises a condenser 28 which substantially constitutes a short-circuit for alternating voltages of any frequency occurring. Similarly, the control grid 8 is connected to the cathode by way of a condenser 29 which substantially means a short-circuit for any alternating frequency occurring. The screen grids are furthermore connected by way of a high-ohmic resistance 27 not shunted for high-frequency current to a point of constant positive potential. It is thus ensured that the grids 6, 7 and 9 substantially cannot exert any detrimental effect on the mixing action.

The resistance 20 has connected in series therewith an inductance 30 having a value such that the phase-shift of the oscillator voltage between cathode and earth brought about by the capacity between cathode and earth (represented diagrammatically in broken lines by a condenser 32) is suppressed. In this case the energy of oscillator frequencies transferred to the control grid 6 across a capacity 33 between the control grid 6 and the cathode 5 may readily be compensated by means of a condenser 31 provided between the anode 15 of the oscillator and grid 6, so that no energy of oscillator frequency is radiated by the aerial.

If, furthermore, a control voltage is supplied across the resistance 24 to the control grid 6, the inductance is preferably connected in parallel with the resistance 20 as shown in Fig. 2, the parallel connection of resistance 21 and condenser 22 being omitted. It is thus possible greatly to reduce the direct-voltage loss at the resistance not shunted for high-frequency current.

What I claim is:

1. A mixing circuit arrangement, comprising a first discharge tube system having cathode, grid and anode electrodes defining a cathode-grid circuit and a cathode-anode circuit, means to apply a signal wave to said cathode-grid circuit, means to derive an intermediate frequency wave from said cathode-anode circuit, a second discharge tube system having cathode, grid and anode electrodes defining a second cathode-grid circuit and a second cathode-anode circuit, said second discharge tube system and said second circuits being in feedback relationship to produce an oscillator wave, means to couple said cathode electrodes together, an un-bypassed resistance element constituting an impedance at the frequencies of said signal wave and said oscillator wave, said element being interposed between said coupled cathode electrodes and both the cathode-grid circuit of said first discharge tube system and one of said circuits of said second discharge tube system to thereby produce a signal voltage component and an oscillator voltage component across the said resistance element, and an inductance member interposed between said coupled cathodes and both said first grid-cathode circuit and said one of said second circuits.

2. A mixing circuit arrangement, as set forth in claim 1, wherein said inductance member is connected in series with said resistance element.

3. A mixing circuit arrangement, as set forth in claim 1, wherein said inductance member is connected in parallel with said resistance element.

4. A mixing circuit arrangement, as set forth in claim 1, further including a neutralizing capacitive element interconnecting the grid electrode of said first discharge tube system and the anode of said second discharge tube system.

BERNHARDUS GERHARDUS DAMMERS.

REFERENCES CITED

The following references are of record in the file of this patent:

UNITED STATES PATENTS

| Number | Name | Date |
|---|---|---|
| 2,111,764 | Foster | Mar. 22, 1938 |
| 2,282,861 | Gardiner | May 12, 1942 |
| 2,383,345 | Seiler | Aug. 21, 1945 |
| 2,512,399 | Knapp | June 20, 1950 |

FOREIGN PATENTS

| Number | Country | Date |
|---|---|---|
| 66,311 | Norway | June 15, 1943 |
| 66,875 | Norway | Oct. 11, 1943 |